(12) United States Patent
Harada et al.

(10) Patent No.: US 6,273,247 B1
(45) Date of Patent: Aug. 14, 2001

(54) STORING CASE WITH ENGAGING PAWL

(75) Inventors: Tomitaro Harada, Osaka; Kaku Hanazawa, Tokyo; Hashira Ryo, Tochigi, all of (JP)

(73) Assignee: Kabushiki Kaisha Bandai, Tokyo (JP)

( * ) Notice: Subject to any disclaimer, the term of this patent is extended or adjusted under 35 U.S.C. 154(b) by 0 days.

(21) Appl. No.: 09/470,283

(22) Filed: Dec. 22, 1999

(30) Foreign Application Priority Data

Jan. 26, 1999 (JP) .................................................. 11-016679

(51) Int. Cl.$^7$ .................................................. B65D 85/30
(52) U.S. Cl. ............................................. 206/307; 206/493
(58) Field of Search ............................. 206/307, 308.1, 206/308.3, 493, 775

(56) References Cited

U.S. PATENT DOCUMENTS

| | | |
|---|---|---|
| 4,664,261 | 5/1987 | Frodelius . |
| 5,385,235 * | 1/1995 | Ikebe et al. ....................... 206/307 X |
| 5,704,474 * | 1/1998 | Oland ................................. 206/308.1 |
| 5,954,198 * | 9/1999 | Ikebe et al. ........................ 206/308.3 |
| 5,960,948 * | 10/1999 | Shiga et al. .................... 206/308.3 X |

* cited by examiner

*Primary Examiner*—Bryon P. Gehman
(74) *Attorney, Agent, or Firm*—Baker & McKenzie (57) ABSTRACT

A storing case for holding a recording medium is provided where the recording medium can be easily stored and removed. The storing case has a sturdy structure that is durable and in which the stored recording medium is securely retained. The storing case comprises an outer case and an inner case, which are assembled to provide a storage cavity. First engaging portions and a second engaging portion are formed in upper and lower parts of inner side surfaces of a right wall and a left wall of the outer case. Third engaging portions and fourth engaging portions are engaged in the first engaging portions and the second engaging portions and are formed in the upper and lower parts of outer side surfaces of a right wall and a left wall of the inner case. Engaging pawls for engaging recessed portions of the recording medium are provided in the right wall and the left wall.

12 Claims, 10 Drawing Sheets

STORING CASE WITH ENGAGING PAWL

BACKGROUND OF THE INVENTION

1. Field Of The Invention

The present invention relates to a storing case suitable for storing a recording medium such as a cartridge storing a game software.

2. Description Of The Prior Art

There is known a conventional storing case for a recording medium such as a cartridge storing game software. The conventional storing case is formed from soft synthetic resin, and comprises a case body for storing a recording medium and a cover connected to the rear edge of the case body via a thin hinge. An engaging pawl for detachably engaging an engaging recessed portion formed in the front of the cover and retains the cover in a closed state. The above-mentioned conventional storing case has a problem in that it takes time to store a recording medium because the cover is first opened, the recording medium is inserted into the case body, the cover is then closed and the engaging recessed portion of the front part of the cover is engaged with the engaging pawl of the case body to store the recording medium. In addition, it has another problem in that it is difficult to take out the recording medium from the storing case because the cover must be opened while detaching the engaging pawl from the engaging recessed portion. Moreover, the conventional storing case has another problem in that the hinge portion is fragile because it fatigues due to repeatedly opening and closing the cover.

SUMMARY OF THE INVENTION

The present invention has been devised in view of the above problems. Objects of the present invention are to provide a storing case in which it is easy to store and take out a recording medium, the stored recording medium is securely stored and, the storing case is not fragile.

In order to attain the above and other objects, a storing case in accordance with a first aspect of the present invention comprises:

(a) an outer case and an inner case to be attachable to the outer case;

(b) the outer case including a bottom wall, a rear wall extending from a rear part of the bottom wall, a right wall extending from a right part of the bottom wall, and a left wall extending from a left part of the bottom wall, so that an upper part and a front part of the bottom wall are open;

(c) the inner case including an upper wall, a rear wall extending from a rear part of the upper wall, a right wall extending from a right part of the upper wall, and a left wall extending from a left part of the upper wall, so that a lower part and a front part of the upper wall are open;

(d) a storing cavity bounded by the bottom wall of the outer case, the upper, right, left, and rear walls of the inner case, with a front part of the storing cavity opened; and (e) an engaging pawl provided in the right wall and the left wall of the inner case for engaging an item stored in the storing cavity.

A storing case in accordance with a second aspect of the present invention has a first engaging portion and a second engaging portion formed in the upper and lower parts of the inner side surfaces of the right and left walls of the outer case, and has a third engaging portion engageable with the first engaging portion and a fourth engaging portion engageable with the second engaging portion formed in the upper and lower parts of the outer side surfaces of the right and left walls of the inner case, in addition to the above.

A storing case in accordance with a third aspect of the present invention has an engaging pawl that is formed in the shape of an inverted letter "V" and is integrally formed in the inner case with an inclining piece contacting the right or left wall of the outer case being formed on the front part side of the top part and a bent piece that does not contact the right or left wall of the outer case being formed on the rear part side of the top part.

DETAILED DESCRIPTION OF THE INVENTION

A storing case of the present invention is now described with reference to FIG. 1 through FIG. 10. A storing case 1 comprises an outer case 2 and an inner case 21 to be attached to the outer case 2. The outer case 2 is formed from a synthetic resin, and includes a bottom wall 5, a rear wall 6 extending from a rear part of the bottom wall 5, a right wall 7 extending from a right part of the bottom wall 5, and a left wall 9 extending from a left part of the bottom wall 5, so that an upper part and a front part of the bottom wall 5 are open. The right wall 7 and the left wall 9 have rear end edges 7a and 9a formed in a semi-circular shape. The rear wall 6 is formed to extend to about half of the height of the right wall 7 and the left wall 9.

First engaging portions 10 and 10 and a second engaging portion 11 are formed in upper and lower parts of the inner side surfaces 7b and 9b of the right wall 7 and the left wall 9 of the outer case 2. The first engaging portions 10 and 10 are formed in a rectangular recessed shape, and are positioned spaced apart on opposite sides of the portion of the inner side surfaces 7b and 9b of the right wall 7 and the left wall 9 respectively. The second engaging portion 11 is formed substantially in the angle shape by a protrusion, and is positioned substantially in the center of the lower portion of the inner side surfaces 7b and 9b of the right wall 7 and the left wall 9. The rear wall 6 has first stopper pieces 12 and 12 on opposite sides of the inner side surface 6b and engaging holes 13 and 13 are formed inside the first stopper pieces 12 and 12. A notch 15 substantially in the shape of a letter "U" is formed in the front part of the bottom wall 5.

The inner case 21 is formed from a synthetic resin and includes an upper wall 22, a rear wall 23 extending from a rear part of the upper wall 22, a right wall 25 extending from a right part of the upper wall 22, and a left wall 26 extending from a left part of the upper wall 22, with its lower part and front part opened. Second stopper pieces 20 and 20 are provided on opposite sides of the rear part of the inner side surface 24 of the upper wall 22. Third engaging portions 27 and 27 are engageable in the first engaging portions 10 and 10, respectively, and fourth engaging portion 29 is engageable in the second engaging portion 11. Portions 27 and 27 and portion 29 are formed in the upper and lower parts of the outer side surfaces 25a and 26a of the right wall 25 and the left wall 26 of the inner case 21.

The third engaging portions 27 and 27 are formed in rectangular protruding shapes with each having an inclining surface 30 in its lower part, and are positioned on the opposite sides of upper portion of the outer side surfaces 25a and 26a of the right wall 25 and the left wall 26, respectively. The fourth engaging portion 29 is formed substantially in the angle shape by a recessed portion, and is positioned substantially in the center of the lower parts of the outer side surfaces 25a and 26a of the right wall 25 and the left wall 26.

Figure 10:
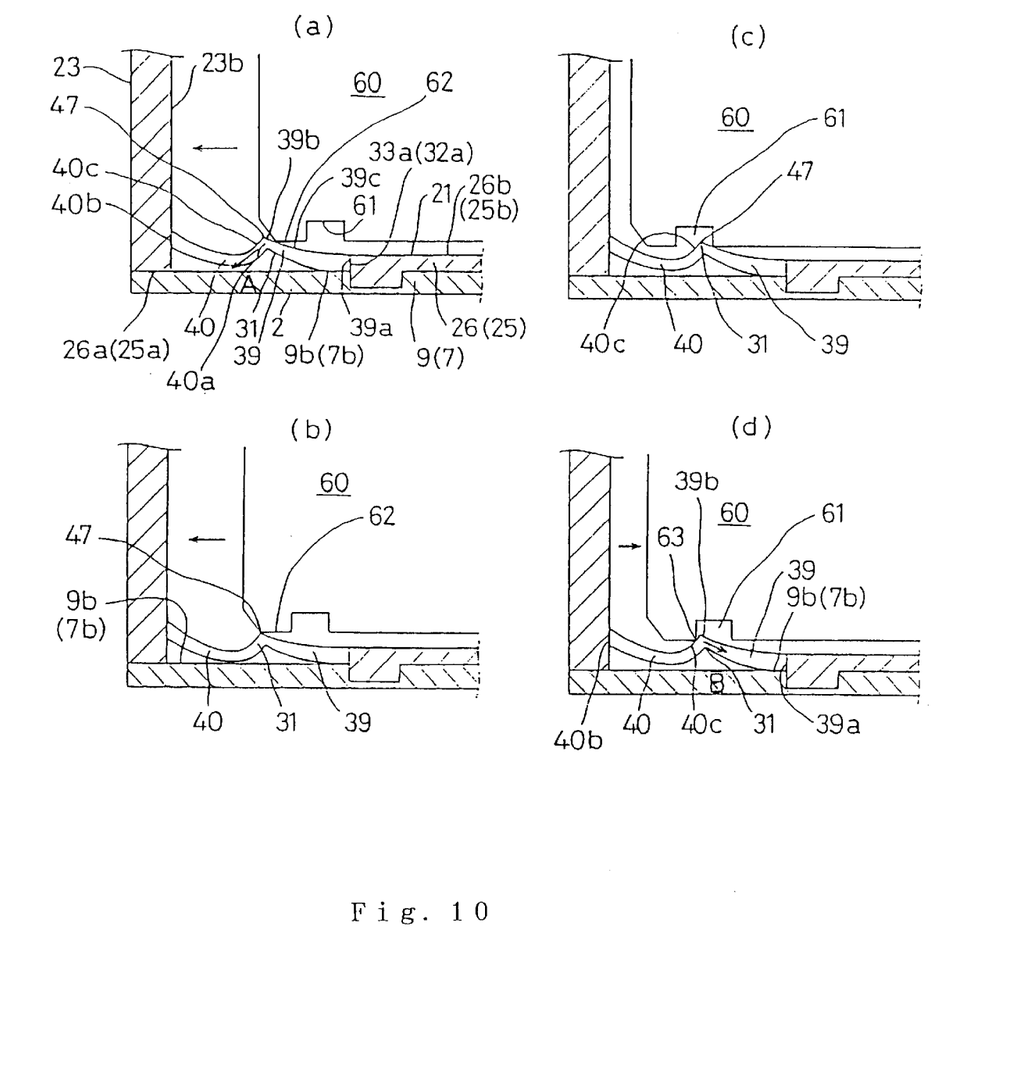
FIGS. 10(a)–10(d) are cross-sectional views showing the storing case in use.

An engaging pawl 31 protruding deeper inside than the inner side surfaces 25b and 26b is provided in each of the right wall 25 and the left wall 26 of the inner case 21. The engaging pawl 31 is integrally formed in the inner case 21 with the engaging pawl 31 being connected to the front end edge 32a or 33a of a recessed portion 32 or 33 formed in the rear part of the right wall 25 or the left wall 26 and an inner side surface 23b of the rear wall 23 (see FIG. 10 (a)).

The engaging pawl 31 is formed substantially in the shape of an inverted letter "V" using an inclining piece 39 on the front part side and a bent piece 40 on the rear part side. The inclining piece 39 is connected to the front end edge 32a or 33a of the recessed portion 32 or 33 in its front end 39a, and gently inclines inward from the outer side surface 25a or 26a of the right wall 25 or the left wall 26.

The bent piece 40 is connected to a rear end 39b of the inclining piece 39 in its front end 40a and the connecting part forms a top part 47 of the engaging pawl 31. The bent piece 40 is connected to the inner side surface 23b of the rear wall 23 in its rear end 40b with the bent piece 40 being deeper inside than the outer side surface 25a or 26a of the right wall 25 or the left wall 26. Further, the inclining edge 39c of the inclining piece 39 on the front part side of the top part 47 of the engaging pawl 31 slopes gently. An inclining edge 40c of the bent piece 40 on the rear part side of the top part 47 of the engaging piece 31 is formed steeper than the inclining edge 39c.

The rear wall 23 has an inner side surface 23b substantially forming a right angle with the upper wall 22 and the outer side surface 23a is in a rounded shape. The rear wall 23 has contacting stepped portion 45 contacting the rear wall 6 of the outer case 2 on the outer side surface 23a. Further, the rear wall 23 has recessed portions 41 and 41 substantially in the shape of a letter "C" formed spaced apart with engaging pawls 42 and 42 formed inside the recessed portions 41 and 41. A notch 43 substantially in the shape of a letter "U" is formed in the front part of the upper wall 22.

The storing case 1 can be readily assembled as described below.

Figure 1:
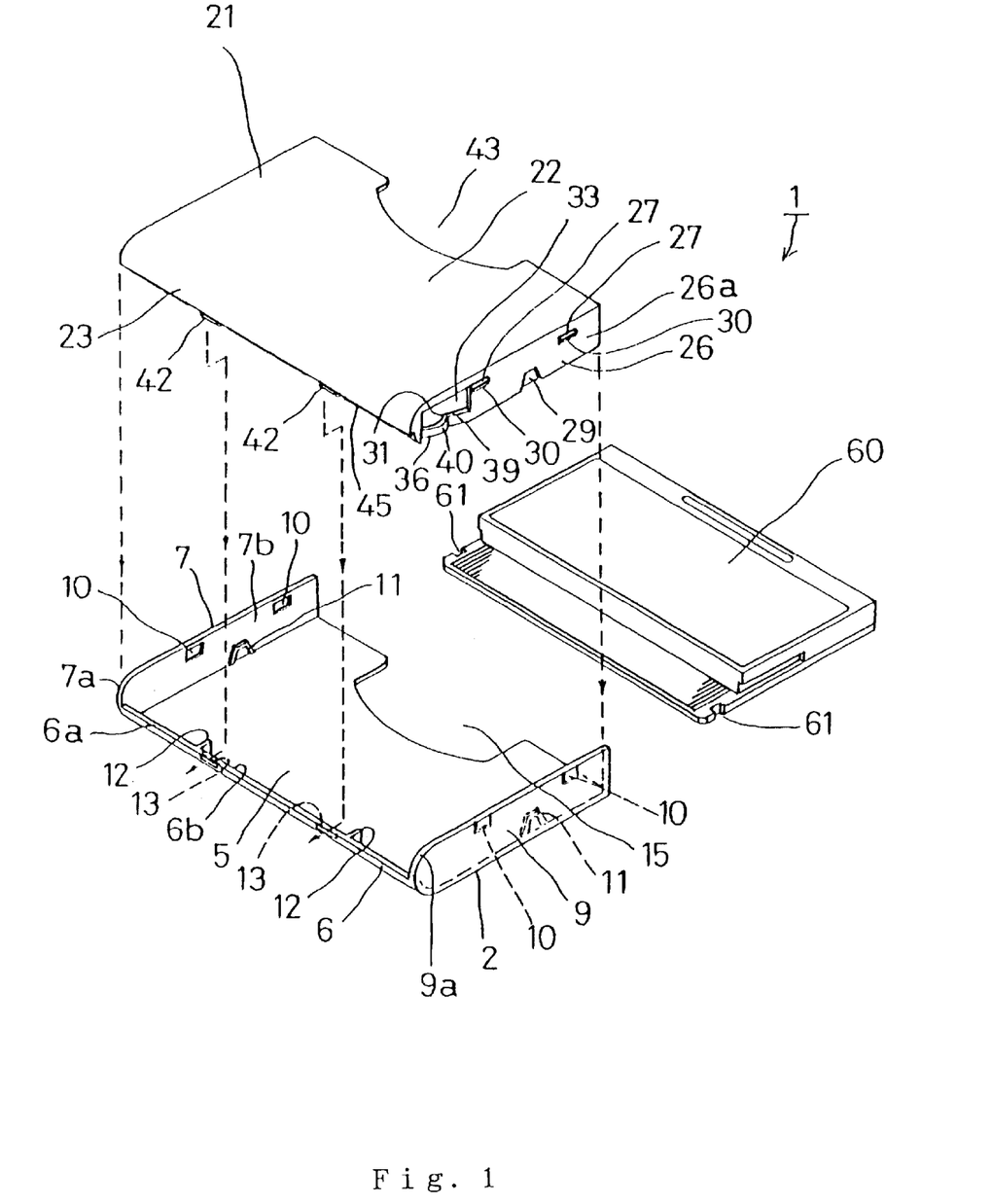
FIG. 1 is an overall exploded perspective view showing an embodiment of a storing case in accordance with the present invention.
Figure 2:
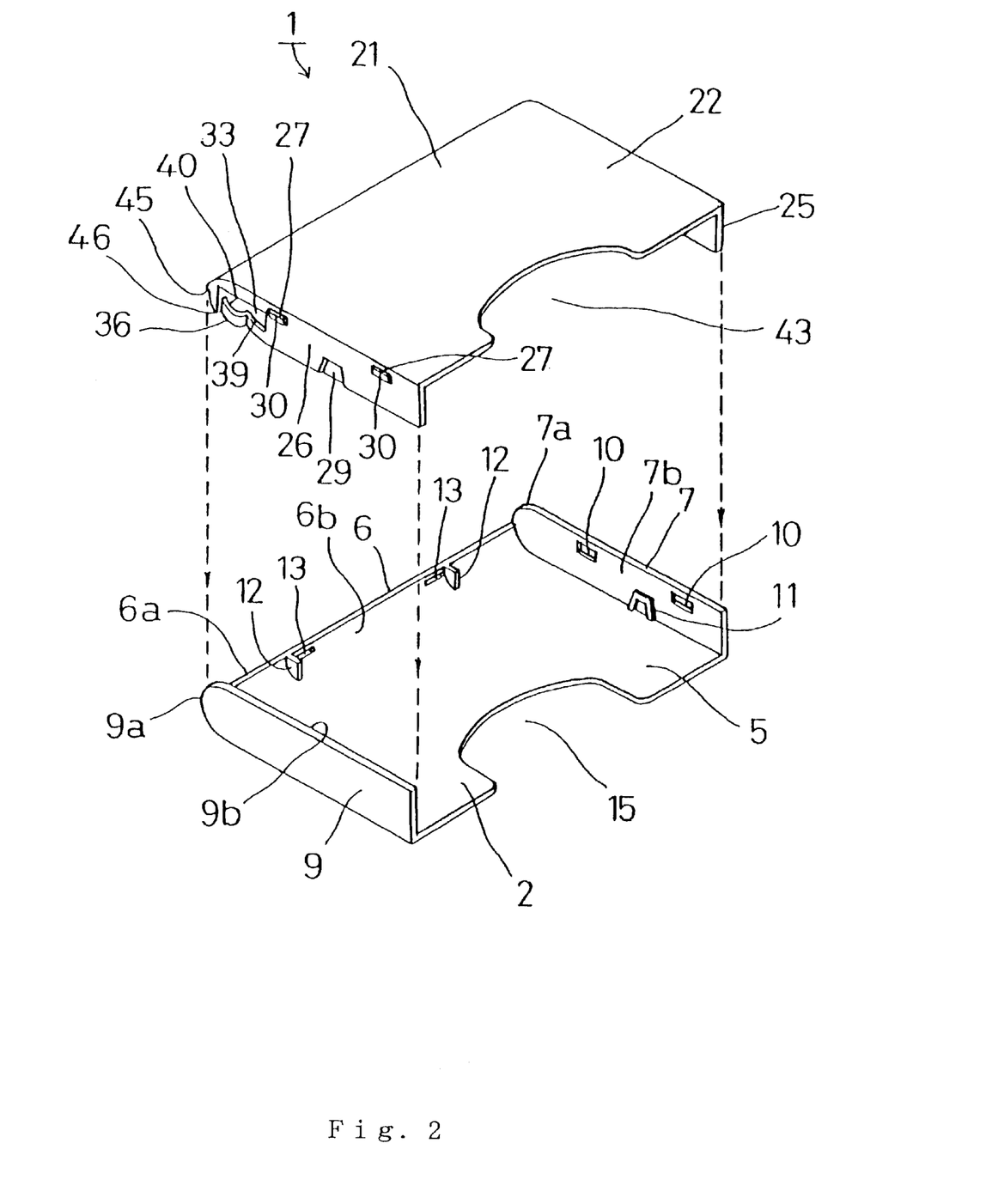
FIG. 2 is an overall exploded perspective view of the storing case of FIG. 1, seen from another direction.
Figure 3:
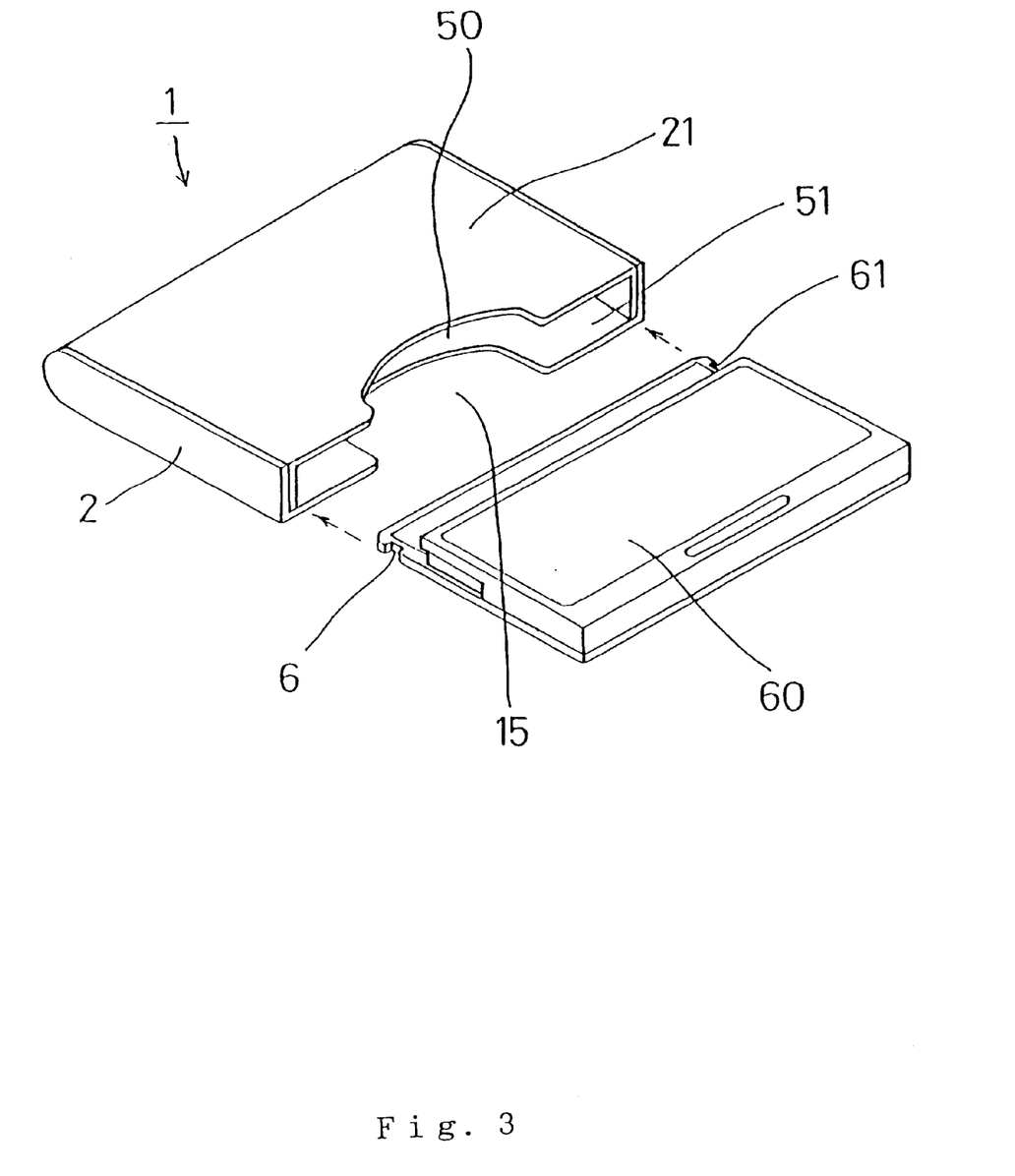
FIG. 3 is a perspective view of the storing case of FIG. 1.

As shown in FIG. 1, the storing case 1 is assembled by engaging the engaging pawls 42 and 42 formed in the rear wall 23 the inner case 21 in the engaging holes 13 and 13 formed in the rear wall 6 of the outer case 2 and inserting the inner case 21 into the outer case 2 from above. The third engaging portions 27 and 27 of the inner case 21 are engaged in the first engaging portions 10 and 10 of the outer case 2, and the fourth engaging portion 29 of the inner case 21 is fittingly engaged in the second engaging portion 11 of the outer case 2.

Figure 4:
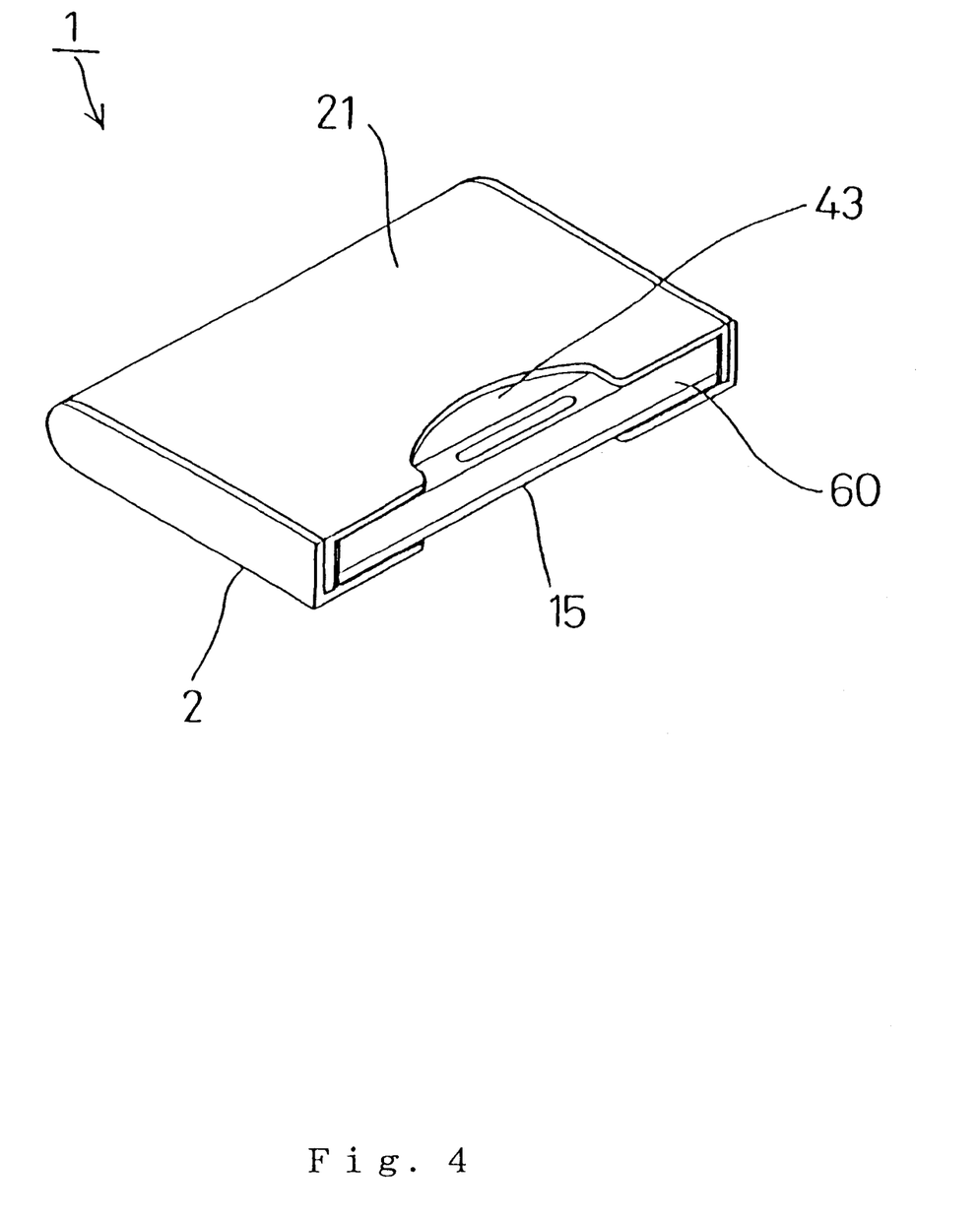
FIG. 4 is an overall perspective view showing a state in which the storing case is used.
Figure 5:
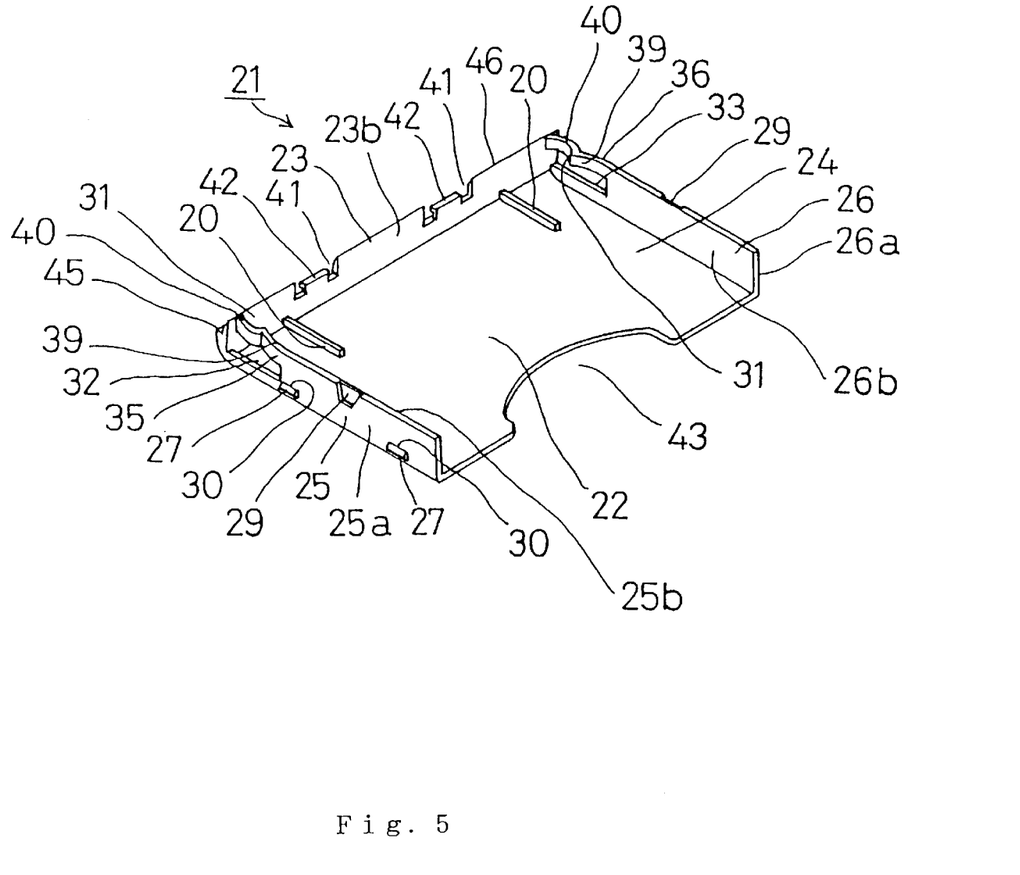
FIG. 5 is a perspective view of an inner case, seen from the lower side.
Figure 6:
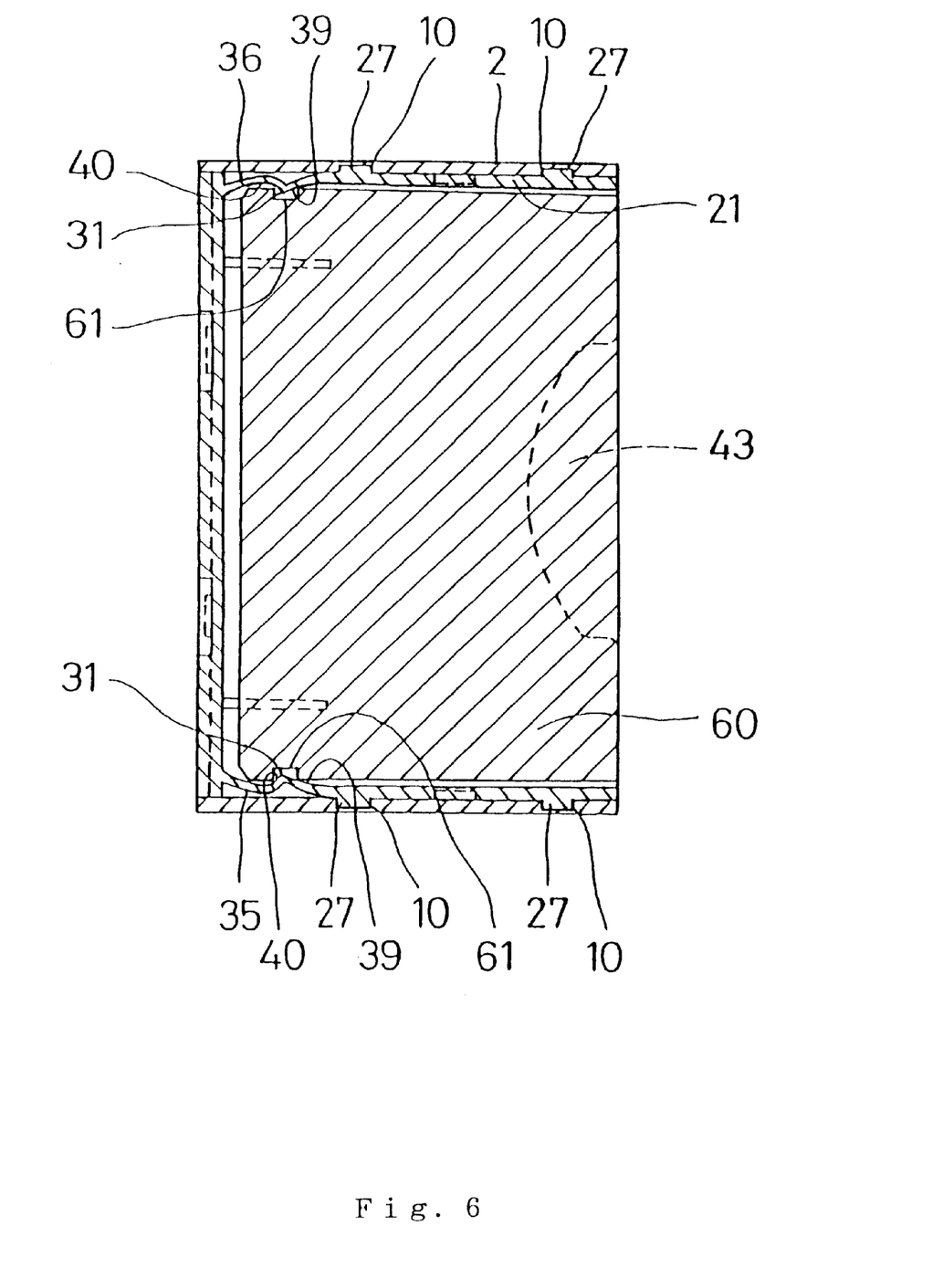
FIG. 6 is a plan sectional view of FIG. 4.
Figure 7:
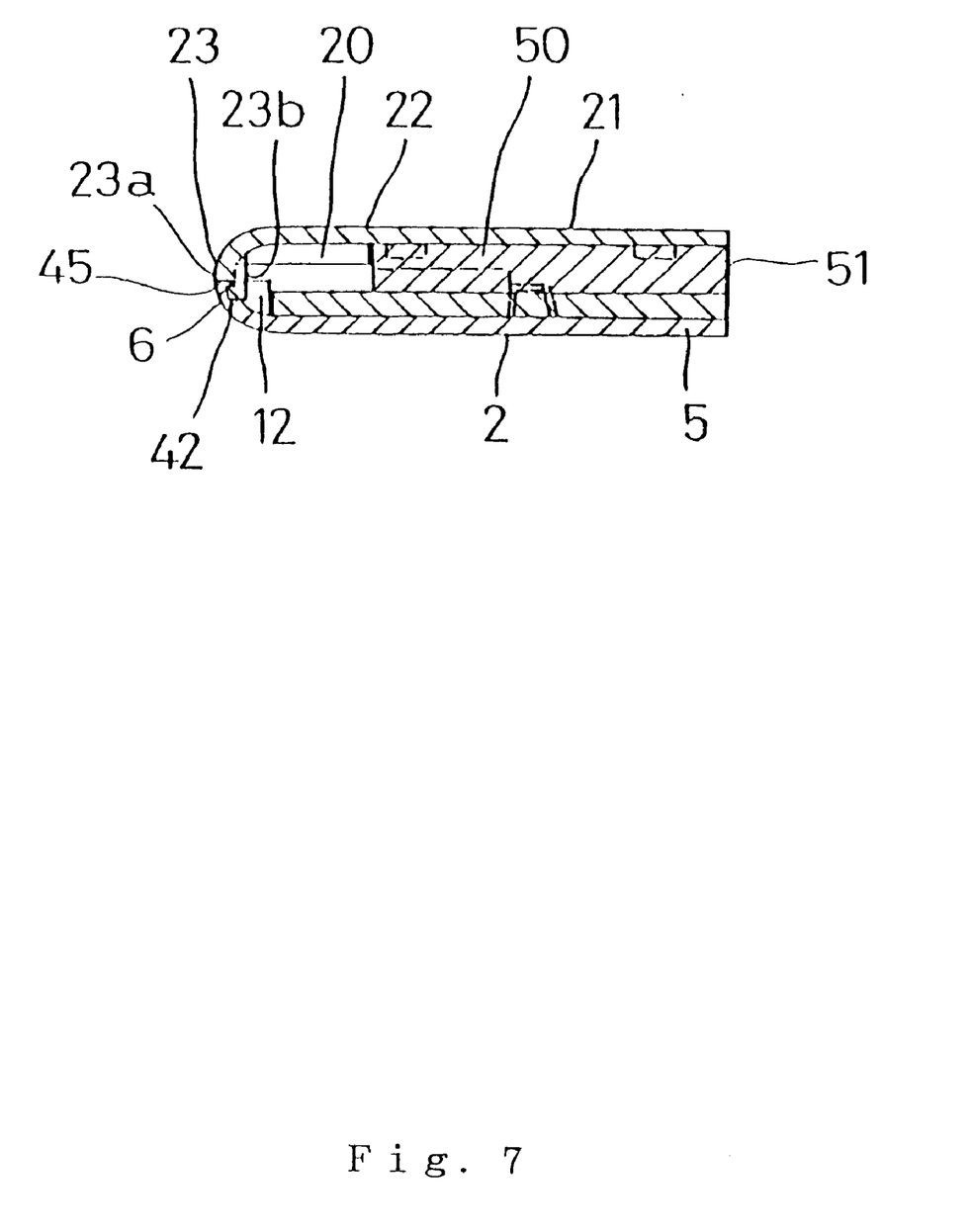
FIG. 7 is aside sectional view of FIG. 4.

The contacting stepped portion 45 of the rear wall 23 of the inner case 21 contacts the upper end 6a of the rear wall 6 of the outer case 2. A tip part 46 of the contacting stepped portion 45 contacts the inner side surface 6b of the rear wall 6 of the outer case 2. The inner side surface 7b of the right wall 7 of the outer case 2 contacts the outer side surface 25a of the right wall 25 of the inner case 21. The inner side surface 9b of the left wall 9 of the outer case 2 contacts the outer side surface 26a of the left wall 26 of the inner case 21. Thereby, the storing case 1 is assembled as shown in FIG. 4.

The first stopper pieces 12 and 12 of the outer case 2 protrude from a gap of the recessed portion 41 of the inner case 21 into the inner case 21. As shown in FIG. 10(a), the inclining pieces 39 and 39 of the engaging pawls 31 and 31 of the inner case 21 contact the inner side surfaces 7b and 9b of the right wall 7 and the left wall 9 of the outer case 2 in their respective front portions. The bent piece 40 is deeper inside than the outer side surface 25a or 26a of the right wall 25 or the left wall 26, and the bent piece 40 does not contact the inner side surfaces 7b and 9b of the right wall 7 and the left wall 9. In this way, the storing case 1 is assembled, and forms a storing cavity 50 with a front part 51 opening that is bounded by the bottom wall 5 of the outer case 2, the upper wall 22 of the inner case 21, the right wall 25, the left wall 26 and the rear wall 23.

The storing case 1 can receive a recording medium 60 by inserting the recording medium from the front part 51 into the storing cavity 50. The recording medium 60 is inserted until it contacts the first stopper pieces 12 and 12 and the second stopper pieces 20 and 20. Engaging recessed portions 61 and 61 formed on the both sides of the recording medium 60 are engaged by the engaging pawls 31 and 31 of the inner case 21.

When the recording medium 60 is inserted from the front part 51 into the storing case 1, side edge 62 of the front part of the storing medium 60 contacts the inclining edge 39c of the inclining piece 39 of the engaging pawl 31 as shown in FIG. 10(a). The rear end 39b of the inclining piece 39 is bent outward with the front end 39a as the fulcrum, and a force is applied to the front end 40a of the bent piece 40 in the arrow A direction. When a force acts in the arrow A direction, the front end 40a of the bent piece 40 is bent outward with the rear end 40b as the fulcrum. However, since the bent piece 40 is bent not to contact the inner side surfaces 7b and 9b of the right wall 7 and the left wall 9, it does not contact the inner side surfaces 7b and 9b and therefore, the top part 47 of the engaging pawl 31 can be bent outward by a relatively weak force with the rear end 40b as the fulcrum.

As described above, the recording medium 60 can be inserted easily with a weak force into the storing cavity 50 of the storing case 1. In addition, since the inclining edge 39c of the engaging piece 39 is formed in a gentle angle, a very weak force may be sufficient. When inserted in this way, the top part 47 of the engaging pawl 31 resists the elasticity of a material and is moved outside by the both side edges 62 and 62 of the front part of the recording medium 60.

When the recording medium 60 is inserted to a predetermined position as shown in FIG. 10(c), the top part 47 of the engaging pawl 31 is engaged in the engaging recessed portions 61 and 61 of the recording medium 60 by the elasticity of a material.

When the recording medium 60 is taken out from the front part 51 of the storing case 1, the rear edge 63 of the engaging recessed portion 61 of the storing medium 60 contacts the inclining edge 40c of the bent piece 40 of the engaging pawl 31 as shown in FIG. 10(d). The front end 40a of the bent piece 40 is bent outward with the rear end 40b as the fulcrum, and a force is applied to the rear end 39b of the inclining piece 39 in the arrow B direction. When a force acts in the arrow B direction, although the rear end 39b of the inclining piece 39 is bent outward with the front end 39a as the fulcrum, since the front part in the acting direction of a force acts upon the inner side surfaces 7b and 9b of the right wall 7 and the left wall 9, a relatively strong force is necessary to bend the inclining piece 39 outward with the front end 39a as the fulcrum.

As described above, a strong force is necessary to take out the recording medium 60 from the storing cavity 50 of the storing case 1. Further, since the inclining edge 40c of the bent piece 40 is formed with a steep angle, a much stronger force is necessary than when inserting the recording medium. When taken out in this way, the top part 47 of the engaging pawl 31 is moved outside by the side edges 62 and 62 of the front part of the recording medium 60 against the elasticity of a material.

As described so far, the storing case 1 is made such that the recording medium 60 can be easily inserted but is harder to take it out. Therefore, when the recording medium 60 is carried in the storing case 1, the recording medium 60 is securely retained and avoids coming out of the storing case 1, where it can be damaged or be tainted by dust. Further, since the notches 43 and 15 are formed in the upper wall 22 and the bottom wall 5 of the storing case 1, the recording medium 60 can be taken out by directly holding with fingers via the notches 43 and 15.

Figure 8:
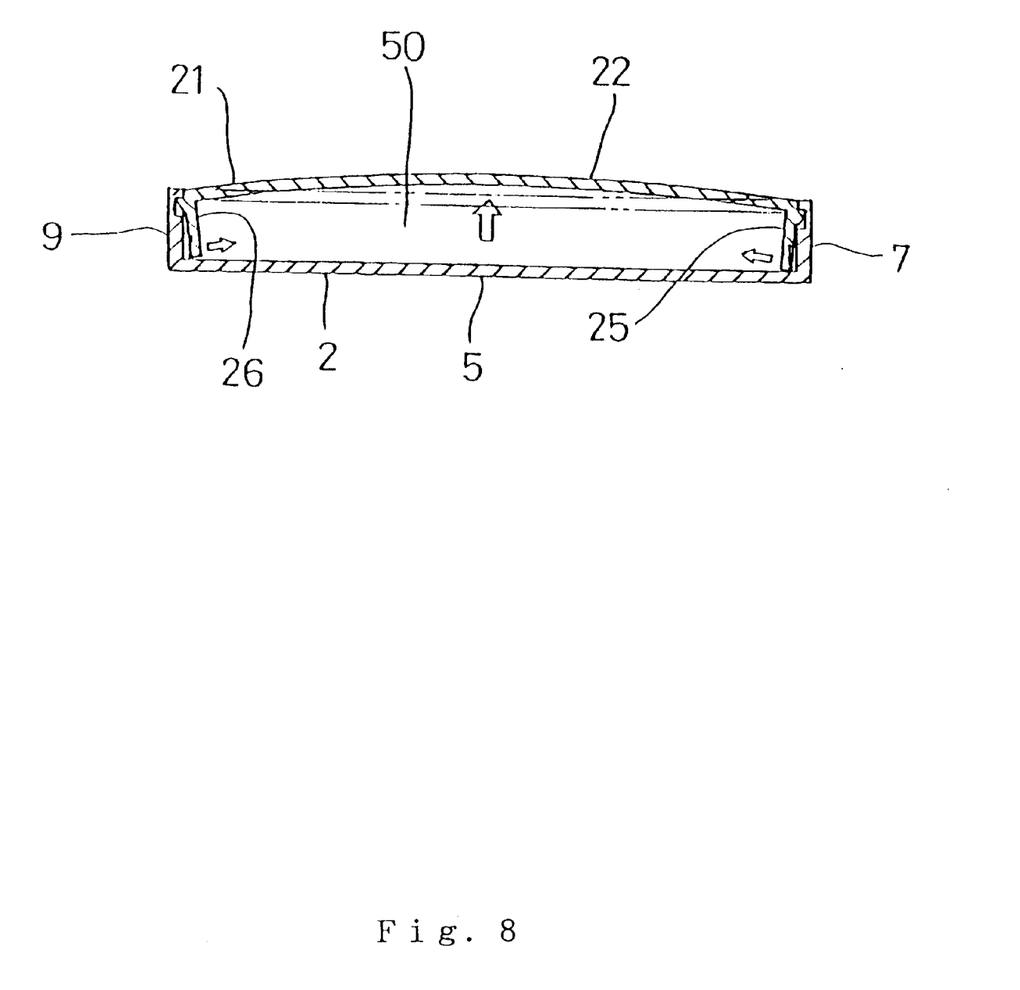
FIG. 8 is a front sectional view showing a state in which the inner case is bent outward.

Since the storing case 1 includes two main parts, i.e., the outer case 2 and the inner case 21, various kinds of storing cases 1 can be formed by preparing a plurality of the outer cases 2 and the inner cases 21 with different colors and patterns and then making combinations of these kinds of the outer case 2 and the inner case 21. Further, as shown in FIG. 8 and FIG. 9, when an outer force is applied to the storing case 1, although the outer force can affect and deform either the outer case 2 or the inner case 21, since the other is not affected, the storing case 1 has a structure that is hard to be broken and which disperses an applied force.

In addition, in the storing case 1, the outer case 2 and the inner case 21 do not separate easily even if an external force is applied. For example, as shown in FIG. 8, even if the upper wall 22 of the inner case 21 is bent outward by an external force, the lower ends of the left wall 26 and the right wall 25 are deformed inward and the fourth engaging portions 29 and 29 come off from the second engaging portions 11 and 11 of the outer case 2. In such a manner, the outer case 2 and the inner case 21 do not separate because the third engaging portions 27 and 27 do not come off from the first engaging portions 10 and 10.

Figure 9:
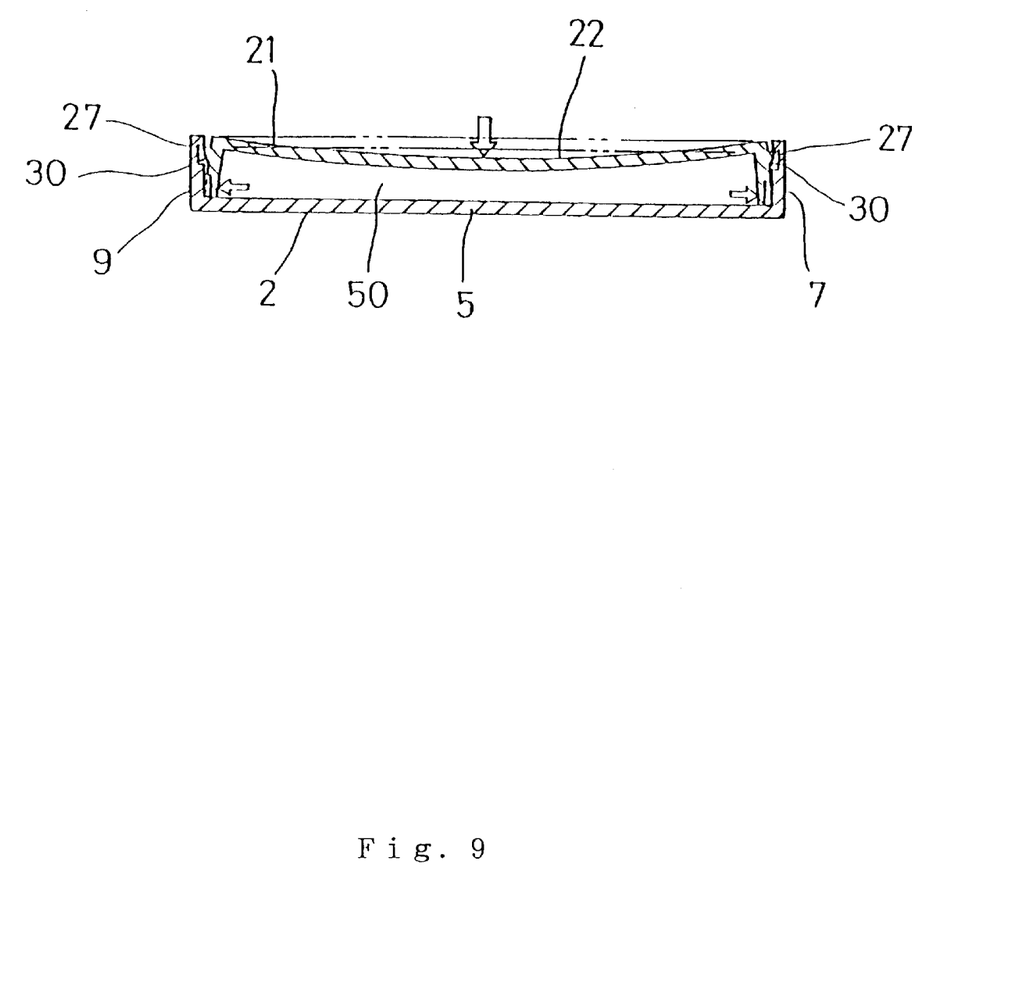
FIG. 9 is a front sectional view showing a state in which the inner case is bent inward.

Moreover, as shown in FIG. 9, even if the upper wall 22 of the inner case 21 is bent inward by an external force, the upper ends of the left wall 26 and the right wall 25 are deformed inward and the third engaging portions 27 and 27 come off from the first engaging portions 10 and 10 of the outer case 2. In such a manner, the outer case 2 and the inner case 21 do not separate because the fourth engaging portions 29 and 29 do not come off from the second engaging portions 11 and 11. In this way, the storing case remains intact and is not damaged because the storing case 1 is easy to be assembled but hard to be disassembled.

Having described above, the storing case in accordance with the first aspect of the present invention has the effect that, since the storing case consists of the two parts, namely, the outer case and the inner case, various types of storing case may be formed by preparing a plurality of the outer cases and the inner cases with different colors and patters and combining these. Further, the storing case has the effect that when an external force is applied to the storing case, although the external force affects and deforms either the outer case or the inner case, since the other is never affected, the storing case has a structure hard to be broken and which efficiently disperses an applied external force. In addition, the storing case in accordance with the first aspect of the present invention has the advantage that there is no such trouble of opening the cover and storing or taking out an item as can occur in the conventional storing case, but an item can be easily stored in the storing cavity simply by inserting it from the front opening and can be easily taken out from the storing cavity simply by pulling it out from the front opening. Moreover, the storing case also has the advantage that an item stored in the storing case is securely retained because the item is engaged by the engaging pawls.

In the storing case in accordance with a second aspect of the present invention, the first engaging portion and the second engaging portion are formed in the upper and lower parts of the inner side surfaces of the right wall and the left wall of the outer case. The third engaging portion is engageable in the first engaging portion and the fourth engaging portion is engageable in the second engaging portion, and are formed in the upper and lower parts of the outer side surfaces of the right wall and the left wall of the inner case. Thereby, even if the upper wall of the inner case is bent outward by an external force, and the lower ends of the left wall and the right wall are deformed inward and the fourth engaging portions of the inner case come off from the second engaging portions of the outer case, the outer case and the inner case never separate because the third engaging portions do not come off from the first engaging portions. Similarly, even if the upper wall of the inner case is bent inward by an external force, and the upper ends of the left wall and the right wall are deformed inward and the third engaging portions of the inner case come off from the first engaging portions of the outer case, the outer case and the inner case never separate because the fourth engaging portions do not come off from the second engaging portions. In this way, the storing case in accordance with the second aspect of the present invention has the effect that it cannot be disassembled easily even if the inner case or the outer case is deformed, and it holds together as a single unit.

In accordance with a third aspect of the present invention, the storing case has the engaging pawl substantially in the shape of an inverted letter "V", with the inclining piece connected to the right or left wall of the outer case on the front part side of the top part, and the bent piece not contacting the right or left wall of the outer case on the rear part side of the top part. Thereby, an item can be stored with a weak force and can be removed if it is pulled out with a stronger force. In this way, the storing case in accordance with the third aspect of the present invention has the effect that, when an item is carried in the storing case, the item will not accidentally dislodge from the storing case to be damaged or get tainted by dust because the storing case can easily retain the item, but the item does not easily dislodge.

Thus, it is seen that a storing case is provided. One skilled in the art will appreciate that the present invention can be practiced by other than the preferred embodiments which are presented for the purposes of illustration and not of limitation, and the present invention is limited only by the claims which follow.

What is claimed is:

1. A storing case comprising:
   (a) an outer case and an inner case attachable to the outer case;
   (b) the outer case including a bottom wall, a rear wall extending from a rear part of the bottom wall, a right wall extending from a right part of the bottom wall, and a left wall extending from a left part of the bottom wall, so that an upper part and a front part of the bottom wall are open;
   (c) the inner case including an upper wall, a rear wall extending from a rear part of the upper wall, a right wall extending from a right part of the upper wall, and a left wall extending from a left part of the upper wall, so that a lower part and a front part of the upper wall are open;
   (d) a storing cavity bounded by the bottom wall of the outer case, the upper wall, right wall, left wall and rear wall of the inner case, with a front part of the storing cavity opened; and
   (e) a first engaging pawl provided in one of the right wall or the left wall of the inner case, the first engaging pawl including a first end integrally formed with the respective one of the left wall or right wall of the inner case, a second end integrally formed with the rear wall of the inner case, and a displaceable middle section between the first end and the second end.

2. A storing case in accordance with claim 1, further comprising:
   a first engaging portion and a second engaging portion formed in the upper and lower parts of the inner side surfaces of the right and left walls of the outer case; and a third engaging portion engageable in the first engaging portion and a fourth engaging portion engageable in the second engaging portion, the third engaging portion and the fourth engaging portion formed in the upper and lower parts of the outer side surfaces of the right and left walls of the inner case.

3. A storing case in accordance with claim 2, wherein the middle section of the engaging pawl is formed in a reverse V letter shape such that the point of the V is away from the right or left wall in an outward direction and includes an inclining piece adjacent the first end contacting the respective one of the right or left wall of the outer case and a bent piece that does not contact the right or left wall of the outer case.

4. A storing case in accordance with claim 3, wherein the inclining piece is curved inwardly towards an interior of the storing cavity.

5. A storing case in accordance with claim 3 wherein the bent piece includes a first end integrally formed with the inclining piece and a second end opposite the first end integrally formed with the rear wall of the inner case.

6. A storing case in accordance with claim 3 wherein:
   the inclining piece includes an first inclining edge having a first concave curvature;
   the bent piece including a second inclining edge having a second concave curvature, the second concave curvature being greater than the first concave curvature.

7. A storing case in accordance with claim 1, wherein the middle section of the engaging pawl is formed in a reverse V letter shape such that the point of the V is away from the right or left wall in an outward direction and includes an inclining piece adjacent the first end contacting the respective one of the right or left wall of the outer case and a bent piece that does not contact the right or left wall of the outer case.

8. A storing case in accordance with claim 7, wherein the inclining piece is curved inwardly towards an interior of the storing cavity.

9. A storing case in accordance with claim 7 wherein the bent piece includes a first end integrally formed with the inclining piece and a second end opposite the first end integrally formed with the rear wall of the inner case.

10. A storing case in accordance with claim 7 wherein:
    the inclining piece includes an first inclining edge having a first concave curvature;
    the bent piece including a second inclining edge having a second concave curvature, the second concave curvature being greater than the first concave curvature.

11. A storing case in accordance with claim 1 further comprising a second engaging pawl provided in the other of the right wall or left wall of the inner case, on the opposite wall of the inner case from the first engaging pawl, the second engaging pawl including a first end integrally formed with the respective other of the right wall or left wall of the inner case, a second end integrally formed with the rear wall of the inner case, and a displaceable middle section between the first end and the second end.

12. A storing case comprising:
    (a) an outer case and an inner case attachable to the outer case;
    (b) the outer case including a bottom wall, a rear wall extending from a rear part of the bottom wall, a right wall extending from a right part of the bottom wall, and a left wall extending from a left part of the bottom wall, so that an upper part and a front part of the bottom wall are open;
    (c) the inner case including an upper wall, a rear wall extending from a rear part of the upper wall, a right wall extending from a right part of the upper wall, and a left wall extending from a left part of the upper wall, so that a lower part and a front part of the upper wall are open;
    (d) a storing cavity bounded by the bottom wall of the outer case, the upper wall, right wall, left wall and rear wall of the inner case, with a front part of the storing cavity opened; and
    (e) a displaceable engaging pawl means for engaging a receiving element of a medium case, the engaging pawl means including:
       an inclining piece means for engaging a leading edge of a medium case and transmitting a displacement force from the leading edge of the medium case to the engaging pawl means upon insertion of the medium case into the string case, the inclining piece means attached to one of the left or right walls of the inner case; and
       a bent piece means for engaging an edge of the receiving element of the medium case and transmitting a displacement force from the edge of the receiving element to the engaging pawl means upon withdrawal of the medium case from the storing case.

* * * * *